(12) United States Patent
Leng et al.

(10) Patent No.: US 8,682,373 B2
(45) Date of Patent: Mar. 25, 2014

(54) METHOD AND APPARATUS FOR REQUESTING AND HANDLING UPLINK RESOURCE ALLOCATION IN WIRELESS ACCESS NETWORK

(75) Inventors: Xiaobing Leng, Shanghai (CN); Dongyao Wang, Shanghai (CN); Jimin Liu, Shanghai (CN); Wu Zheng, Shanghai (CN)

(73) Assignee: Alcatel Lucent, Paris (FR)

( * ) Notice: Subject to any disclaimer, the term of this patent is extended or adjusted under 35 U.S.C. 154(b) by 298 days.

(21) Appl. No.: 13/061,776

(22) PCT Filed: Sep. 2, 2008

(86) PCT No.: PCT/CN2008/001567
§ 371 (c)(1),
(2), (4) Date: Mar. 2, 2011

(87) PCT Pub. No.: WO2010/025580
PCT Pub. Date: Mar. 11, 2010

(65) Prior Publication Data
US 2011/0151914 A1  Jun. 23, 2011

(51) Int. Cl.
*H04B 7/00* (2006.01)
*H04B 15/00* (2006.01)
*H04W 72/00* (2009.01)

(52) U.S. Cl.
USPC .......... 455/509; 455/513; 455/514; 455/452.1

(58) Field of Classification Search
USPC ................. 455/509, 513, 514, 515, 452.1
See application file for complete search history.

(56) References Cited

U.S. PATENT DOCUMENTS

| 8,014,349 B2 * | 9/2011 | Kwon et al. ................ 370/329 |
| 2006/0039319 A1 | 2/2006 | Lee et al. |
| 2010/0255850 A1 * | 10/2010 | Kaukoranta et al. ......... 455/450 |

FOREIGN PATENT DOCUMENTS

| CN | 101043709 A | 9/2007 |
| CN | 101087170 A | 12/2007 |
| CN | 101132628 A | 2/2008 |
| EP | 1 401 159 A1 | 3/2004 |
| EP | 1 816 793 A1 | 8/2007 |
| WO | 2007/037633 A1 | 4/2007 |

OTHER PUBLICATIONS

International Search Report for PCT/CN2008/001567 dated Jun. 4, 2009.
Supplementary European Search Report of corresponding European Application No. 08800563, dated Jan. 8, 2014, 7 pages.

* cited by examiner

*Primary Examiner* — Tilahun B Gesesse
(74) *Attorney, Agent, or Firm* — Fay Sharpe LLP (57) ABSTRACT

The present invention proposes new method(s) and apparatus (es) used for request and allocation of uplink transmission resource in wireless access network, which enables the mobile terminal to use non-contention resources closely spaced on time domain to trigger or adjust reallocation of uplink resource, so that quick response of the base station to the resource allocation request of a mobile terminal is effectively realized, and the demand of delay sensitive service is satisfied.

15 Claims, 8 Drawing Sheets

METHOD AND APPARATUS FOR REQUESTING AND HANDLING UPLINK RESOURCE ALLOCATION IN WIRELESS ACCESS NETWORK

TECHNICAL FIELD OF THE INVENTION

The present invention relates to wireless access networks, more specifically, to methods and apparatuses, in a wireless access network, for requesting and handling uplink resource allocation.

BACKGROUND OF THE INVENTION

IEEE 802.16m protocol requests that service delay should be further reduced as compared to the current IEEE 802.16e to better support delay-sensitive services, such as voice service, real-time gaming, real-time video stream service or high priority E-commerce, etc. Those delay-sensitive services usually require a data delay between BS and MS less than 10 ms in uplink and downlink directions.

There are several existing bandwidth request and allocation mechanisms in IEEE 802.16e protocols, such as Unsolicited Grant Service (UGS), real-time Polling Service (rtPS), and Extended rtPS (ertPS).

Figure 1:
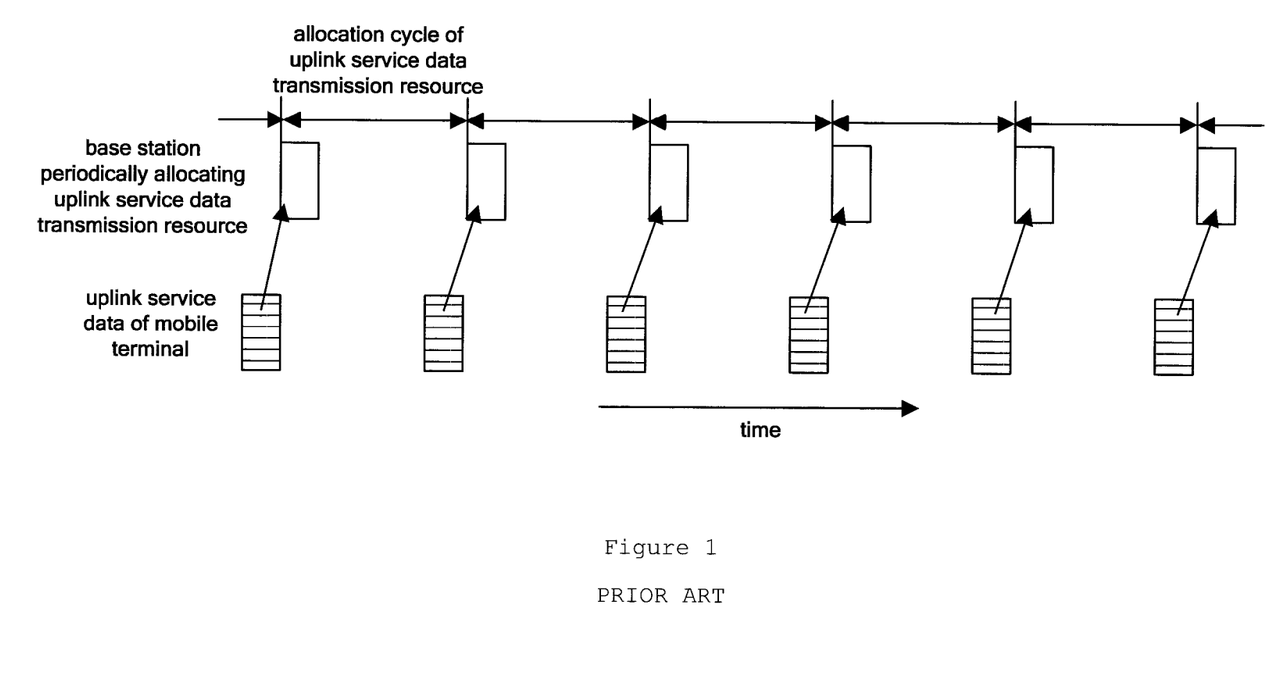
FIG. 1 shows the mode of uplink resource allocation in UGS technology.

The resource allocation manner of UGS technology is shown in FIG. 1, wherein a mobile terminal doesn't need to request any resource, instead, after the establishment and before the end of a service, the base station automatically allocates predefined resource, such as time-frequency resource block, for the service of the mobile terminal after the startup of each allocation cycle. Wherein, for established service which is not ended, taking voice telephone service as example, when both parties involved do not speak during the communication, there is no uplink transmission between the mobile terminal and its dominating base station, however, the service is still active and is allocated with resources, namely, if one party begins to speak, the other party will hear its speech immediately. The voice telephone service won't end until, one party hangs up or severe signal problem or network fault comes forth.

Wherein, in case that each allocation cycle of UGS comprises a number of physical layer frames, the above resource allocation manner of UGS could be comprehended as following: allocating a time-frequency section in one, several or all of the uplink sub frames to the mobile terminal for the transmission of the uplink service data belonging to the service.

It is thus clear that, UGS meets the demands of real-time services concerning delay well, however, this manner similar to static allocation undoubtedly causes relatively serious resource waste, since the uplink service data is not transmitted all the time after the establishment of the service.

Figure 2:
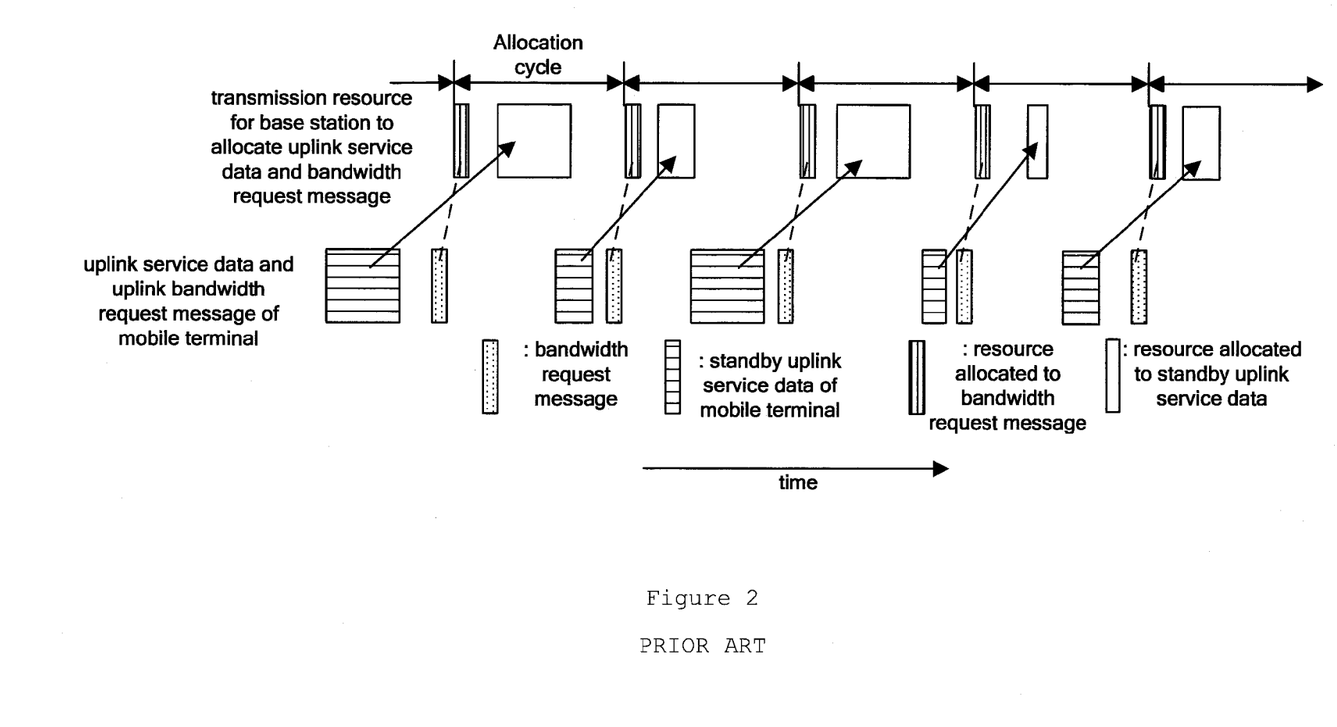
FIG. 2 shows the mode of uplink resource request and allocation in rtPS technology.

Different from UGS, rtPS enables the base station to allocate variable amount of resource to a mobile terminal for a service, as shown in FIG. 2. The base station allocates resource for sending bandwidth request (BR) message and resource for sending uplink service data after the beginnings of each allocation cycle. Hereinafter, the sum of the two kinds of resources is referred to as uplink transmission resource.

Wherein, a mobile terminal could generate the BR message according to the amount of its actually cached uplink service data to be transmitted, and report the BR message to the base station. The base station could dynamically adjust the uplink transmission resource allocated to the mobile terminal for the service according to the received BR message, which is in fact to adjust the amount of the part, in the uplink transmission resource, for transmitting the uplink service data.

Thus, rtPS optimizes the utilization of resource over UG. However, rtPS causes more signaling overhead, since it requires a mobile terminal to continually send BR messages (with a size of 6 bytes) to the base station.

Figure 3A:
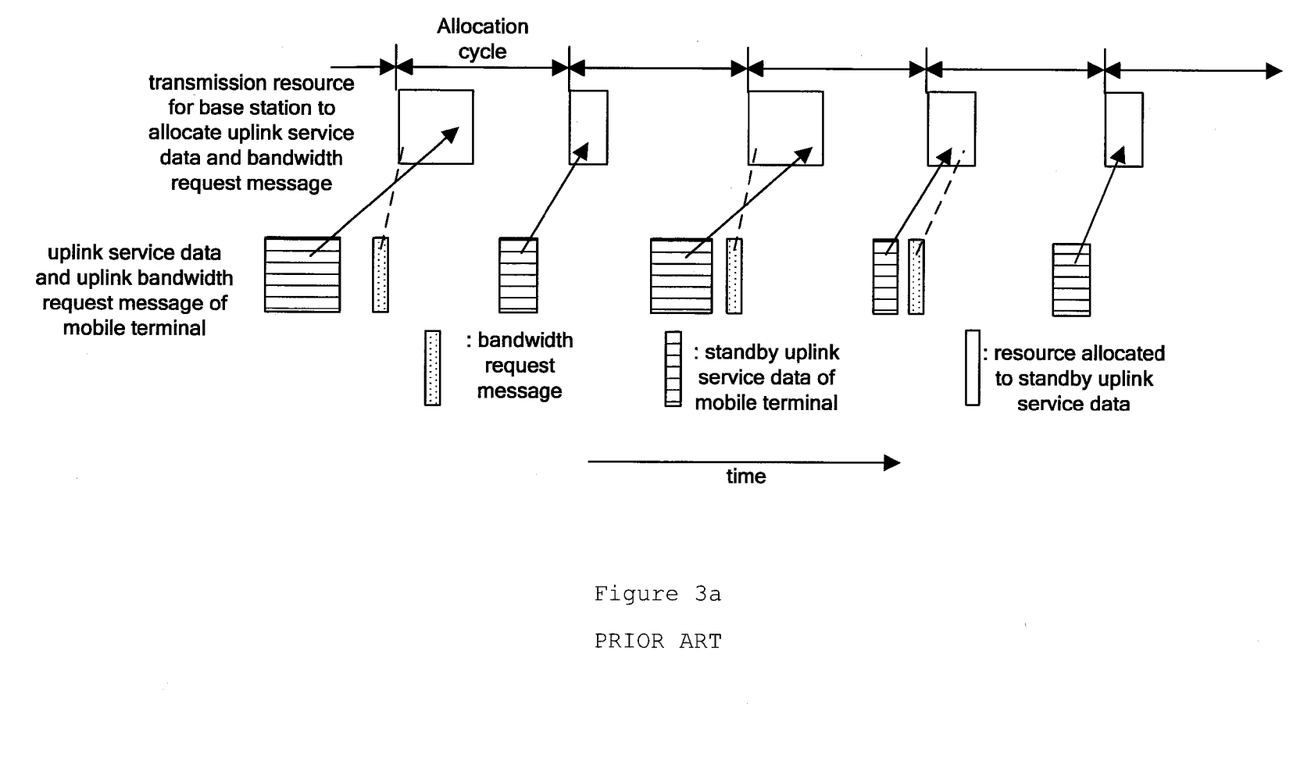
FIG. 3a-3b shows the mode of uplink resource request and allocation in ertPS technology.

The ertPS scheme, based on periodic allocation for uplink transmission resource, unites the advantages of UGS and rtPS. As shown in FIG. 3a, the ertPS scheme doesn't only enable the base station to allocate resource to a mobile terminal without request as in UGS, so that the demand of delay is satisfied, but also allows the mobile terminal to let the base station adjust the amount of resource periodically allocated to it by means of requests. For example, a mobile terminal writes its expected new resource allocation amount into the Extended Piggyback Request field in a Grant Management Subheader (GMSH) following to a Generic MAC header, or into the Bandwidth Request field, i.e. the BR message, in a MAC header having the function of resource request. As shown in FIG. 3, the BR message, aperiodically sent in the resource block shared by uplink service data and BR message allocated by the base station, respectively affects the amount of uplink transmission resource allocated to the service in one or more following allocation cycles.

Wherein, the base station won't change allocation concerning a mobile terminal until it receives a new request of requiring changing the amount of allocated resource from the mobile terminal.

During an allocation cycle, if the standby uplink service data of a mobile terminal is fully transmitted, the mobile terminal will request the base station to adjust the amount of allocated resource to zero, so as to provisionally release the resource occupied by the service. Subsequently, the service comes into silent status. And then, the base station could allocate resource to neither the uplink service data nor the BR message, or could only allocate resource to the BR message. Wherein the resource allocated to BR message is dedicated to the service of the mobile terminal, namely non-contention resources. In case that the base station allocates the above non-content ion resources to BR message, when the standby uplink service data belonging to the service of the mobile terminal comes forth again, the mobile terminal will generate a BR message and send it to the base station by means of the non-contention resources, so as to inform the base station that the service ends the silent status and the base station should periodically allocate uplink transmission resource to it again.

On the contrary, in case that the base station does not allocate resource to BR message, when the standby uplink service data belonging to the service comes forth again, in order to inform the base station about it so that the base station could allocate corresponding resource to the mobile terminal, the following schemes could be adopted by the mobile terminal according to existing ertPS scheme:

to send CDMA code for competing for resource by use of contention resources The so called contention resources are those resources without specific occupier, and available to be competed for by multiple mobile terminals. Because wireless transmission resource is very valuable, each mobile terminal generally uses some information with small size and function of identity identifier or even service identifier, such as CDMA code, to compete for the usufruct of contention resources, instead of using an entire data packet as in wire communication protocol CSMA/CD.

Figure 3B:
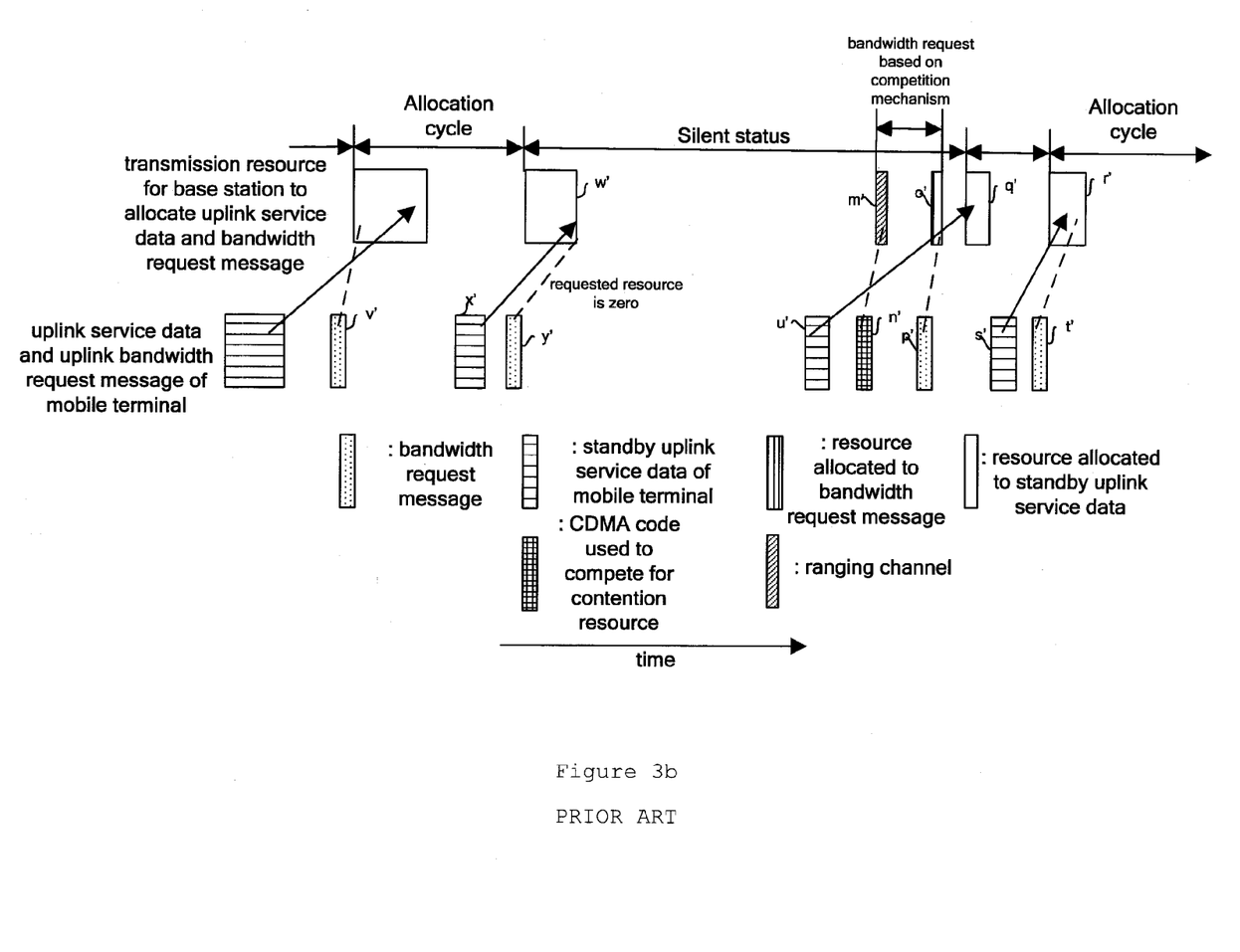

With reference to FIG. 3b, wherein, a mobile terminal requests uplink transmission resource from the base station via BR message v, accordingly, the base station allocates resource block w to the mobile terminal for transmission standby uplink service data x' and the next BR message y'.

When x' is carried by w, there is no standby service data in the buffer of the mobile terminal, therefore, resource requested by the mobile terminal in y' is zero. For example, it is a typical condition of a voice communication service coming into silent status on uplink that the user of the mobile terminal does not speak.

Thus the service of the mobile terminal comes into silent status, and the base station no longer allocates uplink service data transmission resource to the service or non-contention resources to BR message. In conjunction with the above example of voice communication service, when the user of the mobile terminal speaks again, standby data l' will be locally generated, therefore the mobile terminal transmits, on the preassigned ranging channel m', a CDMA code n' for competing for non-contention resources, to request for the usufruct of non-contention resources. Since contention resources are obviously deficient compared to the amount of information of resource requests sent the services of a large numbers of mobile terminals, it is likely to happen that multiple mobile terminals compete for the usufruct of contention resources at the same time, accordingly, it is likely that one or more mobile terminals could not take the chance of using contention resources at the very first time, thereby the mobile terminal needs to retransmit the CDMA code n' on the ranging channel many a time. The delay caused therefrom is usually as tens of times long as the upper limit of acceptable delay of delay sensitive services.

In the case as shown in FIG. 3b, the mobile terminal successfully take the usufruct of contention resources, therefore the base station allocates resource o' to it for transmitting BR message, the mobile terminal accordingly transmits BR message p' to the base station, and finally obtain resource block q'. At the beginning of the next allocation cycle, the base station will allocate a resource block r' of default size for the service of the mobile terminal, for transmitting new standby data s' and new BR message t'.

to send identifier code for requesting to restart allocation of uplink transmission resource by use of CQICH CQICH is the channel exclusively used for reporting the information such as the reception quality of downlink signal by the mobile terminal, and when the base station receives the identifier code transmitted by the mobile terminal on such channel(s), the base station will reallocate uplink transmission resource to the mobile terminal.

However, there exist some condition(s) for a mobile terminal to use CQICH, so that the appearance frequency of CQICH could not usually satisfy the strict demands of delay sensitive services, thus occurs unacceptable delay.

The above solutions in prior arts have respective defects summarized as following:

1. UGS

Certain amount of uplink transmission resource is allocated for service in each allocation cycle, although the delay demand of service is satisfied, the utilization efficiency of resource is sacrificed. No matter whether there is standby uplink service data in a period of time, certain amount of resource is occupied, so that the whole resource efficiency of the system is very low.

2. rtps

The amount of allocated resource could be dynamically adjusted compared to UGS and resource waste is decreased, but the mobile terminal must send a BR message in each allocation cycle, frequent transmission of BR messages causes comparatively high signaling overhead, which obviously does no good to resource efficiency.

3. ertPS

The ertPS based on periodic allocation as shown in FIG. 3a has the basically same defect as that of UGS, namely the resource waste is relatively severe.

The ertPS with competition as shown in FIG. 3b has the defect that, when a mobile terminal send CDMA code for competing for contention resources by use of ranging channel, it may not obtain allocated resource or at least may not obtain allocated resource in time due to competition failure, so as to cause big delay, even to cause service interruption. When a mobile terminal uses CQICH to carry identifier code for requesting uplink transmission resource allocation, the high demand concerning delay of delay sensitive service could not usually be satisfied since CQICH is sparsely distributed along the time axis,

SUMMARY OF THE INVENTION

Since the above problems exist in prior arts, a new method of uplink resource allocation in a wireless access network is proposed in the present invention, wherein non-contention resources closely spaced on time domain being used by the mobile terminal to trigger or adjust reallocation of uplink resource, so that quick response of the base station to the resource allocation request of a mobile terminal is effectively realized, and the demand of delay sensitive service is satisfied.

According to a first aspect of the present invention, there is provided a method, in a base station of the wireless access network, of handling uplink resource allocation, comprising a step of: allocating at least one uplink resource request indication information to a service of a mobile terminal, and allocating sending resources to the mobile terminal for sending corresponding uplink resource request indication information; wherein, services of different mobile terminals and different services of the same mobile terminal will be allocated with different uplink resource request indication information and/or different sending resources by the base station, and the allocated sending resource enables the mobile terminal to send at least one the uplink resource request indication information to the base station within the longest permissible delay of the service when the mobile terminal needs to send uplink service data; the method further comprises steps of: receiving at least one the uplink resource request indication information, which is for requesting the base station to allocate uplink transmission resource, sent by the mobile terminal by use of corresponding sending resource; and responding to the request of the mobile terminal.

According to a second aspect of the present invention, there is provided a method, in a mobile terminal, of requesting a base station to allocate uplink transmission resource, comprising steps of: obtaining at least one uplink resource request indication information allocated by the base station to a service of the mobile terminal and sending resources for the mobile terminal to send corresponding uplink resource request indication information; wherein, the allocated sending resource enables the mobile terminal to send at least one the uplink resource request indication information to the base station within the longest permissible delay of the service, when the mobile terminal needs to send uplink service data; the method further comprises steps of: judging whether needing to request the base station to allocate the uplink transmission resource for the service; if needing to request the base station to allocate uplink transmission resource for the service, sending the allocated at least one the uplink resource request indication information to the base station by using corresponding sending resource.

According to a third aspect of the present invention, there is provided a handling apparatus, in a base station of the wireless access network, for handling uplink resource allocation, comprising: an allocation means, for allocating at least one uplink resource request indication information to a service of a mobile terminal, and allocating sending resources to the mobile terminal for sending corresponding uplink resource request indication information; wherein, services of different mobile terminals and different services of the same mobile terminal will be allocated with different uplink resource request indication information and/or different sending resources by the base station, and the allocated sending resource enables the mobile terminal to send at least one the uplink resource request indication information to the base station within the longest permissible delay of the service when the mobile terminal needs to send uplink service data; the handling apparatus further comprises: a receiving means, for receiving at least one the uplink resource request indication information, which is for requesting the base station to allocate uplink transmission resource, sent by the mobile terminal by use of corresponding sending resource; a response means for responding to the request of the mobile terminal.

According to a fourth aspect of the present invention, there is provided a first requesting apparatus, in a mobile terminal, for requesting a base station to allocate uplink transmission resource, comprising: an obtaining means, for obtaining at least one uplink resource request indication information allocated by the base station to a service of the mobile terminal and sending resources for the mobile terminal to send corresponding uplink resource request indication information; wherein, the allocated sending resource enables the mobile terminal to send at least one the uplink resource request indication information to the base station within the longest permissible delay of the service, when the mobile terminal needs to send uplink service data; the first requesting apparatus further comprises: a judging means, for judging whether needing to request the base station to allocate uplink transmission resource for the service; a second requesting means for, if needing to request the base station to allocate uplink transmission resource for the service, sending at least one the uplink resource request indication information to the base station by using corresponding sending resource.

By using the methods and apparatuses provided in the present invention, the demand concerning delay of delay sensitive service could be effectively satisfied, besides, the present invention helps to increase the resource efficiency of system, and the system complexity is relatively low.

BRIEF DESCRIPTION OF DRAWINGS

With reference to the following detailed description of the non-restrictive embodiments in conjunction with the appendix drawings, other features, objects and advantages of the present invention will be more apparent.

Wherein, same or similar reference numerals refer to the same or similar steps or means (module).

DETAILED DESCRIPTION OF EMBODIMENTS

It is intelligible to those skilled in the art that, the solutions of the present invention described below are applied to either aperiodic real-time services or periodic real-time services or even non-real-time services. Besides, the specific resource request mode provided in the present invention not only could be used at the moment or in the duration that service gets out of silent status, but also could be used at other moments, namely, existing BR message could be replaced by uplink resource request indication information provided in the present invention, and the system could still work normally and is better than prior arts.

Description of Examples of Aperiodic Real-Time Service is Given as Below

In aperiodic real-time services, the base station and the mobile terminal can not foresee when uplink burst occurs, not to mention the size of the burst. According to an embodiment of the present invention, this type of services could be regarded as a process with on-off status, wherein, under on status, service data of corresponding service is generated in the mobile terminal and the mobile terminal cache it and request resource for sending it to the base station, while under off status, the mobile terminal has no data needing to be sent to the base station As mentioned above, it is wasteful for the base station to voluntarily allocate resource to the uplink service data or Br message of the service under the off status.

Once the service of the mobile terminal gets out of silent status, i.e. off status, an important task of the present invention is to enable the mobile terminal to request uplink transmission resource from the base station as early as possible, and to enable the base station to make active response as early as possible.

Figure 4:
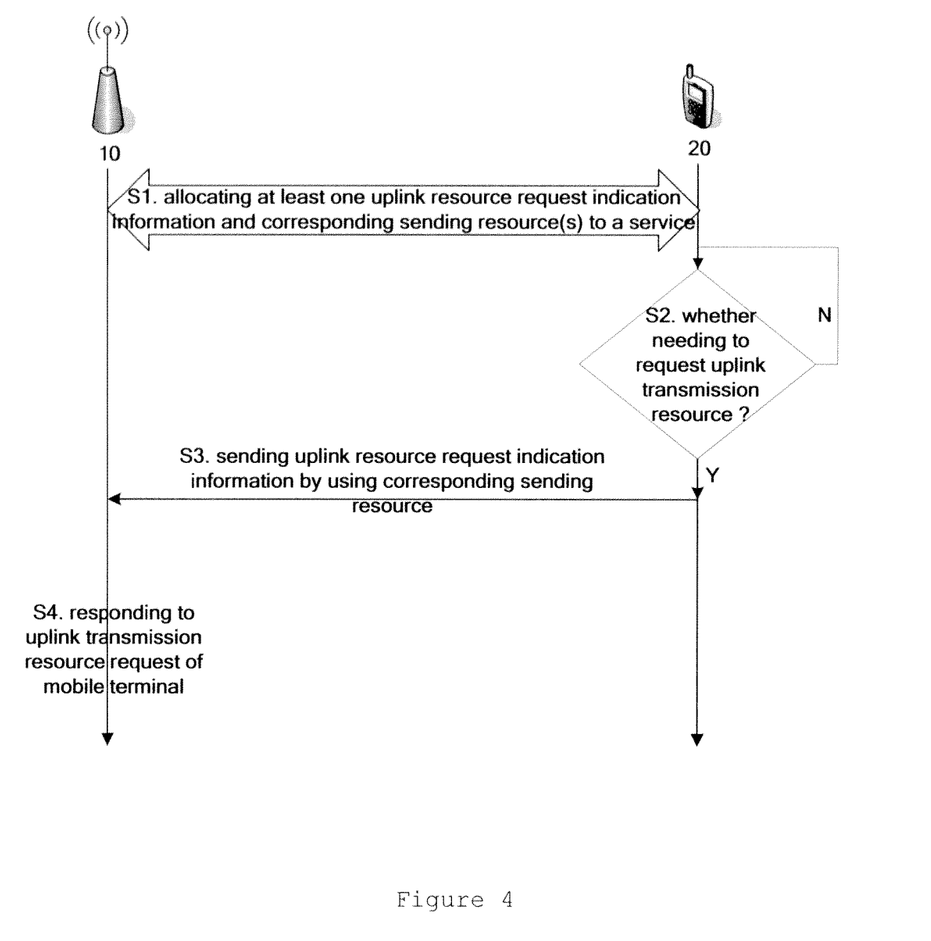
FIG. 4 shows the system flowchart of the method for requesting and allocating uplink transmission resource according to an embodiment of the present invention.
Figure 5:
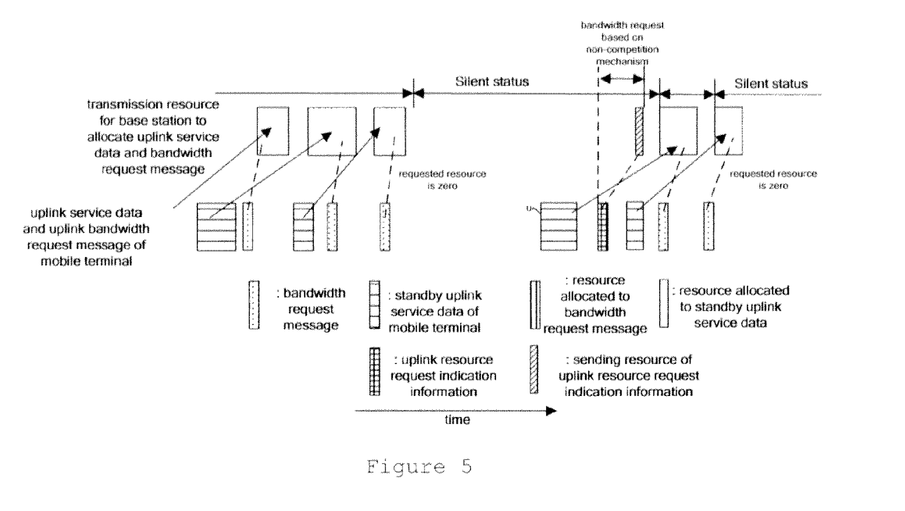
FIG. 5 shows the mode of uplink transmission resource request and allocation according to an embodiment of the present invention.

FIG. 4 shows the system flowchart of the method according to an embodiment of the present invention, and it will be appreciated by those skilled in the art that thereinto the step S1 could have an execution cycle different from those of the other steps. FIG. 5 shows the mode of uplink transmission resource request and al location according to an embodiment of the present invention. The method(s) provided in the present invention will be described in detail as below in conjunction with FIG. 5 and with reference to FIG. 4.

Figure 6:
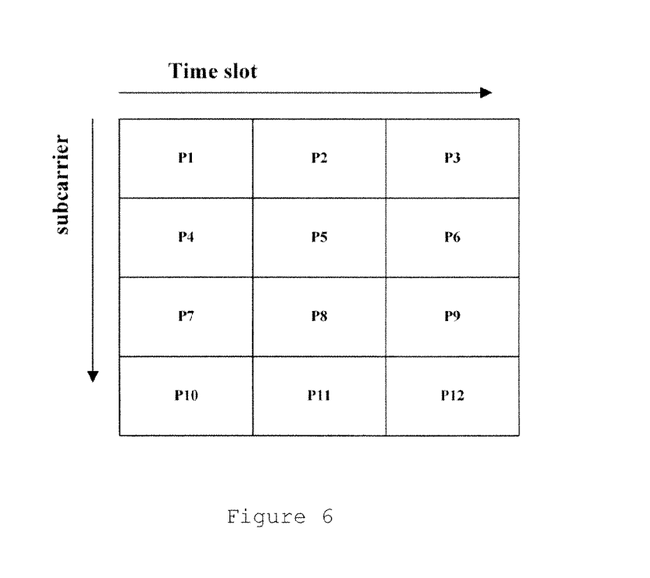
FIG. 6 shows the mode of sending resource allocation according to an embodiment of the present invention.

In the step S1, the base station 10 allocates uplink resource request indication information and corresponding sending resource to a service, such as voice call service, of the mobile terminal 20. This step commonly could be performed after the base station 10 receiving the uplink service establishment request from the mobile terminal 20, wherein the allocated uplink resource request indication information could be CDMA code, which in specific could be gene rated by the PRBS (pseudo-random binary sequence) generator of the base station 10 similar to ranging code generator. In this embodiment, the base station allocates three different CDMA codes, denoted as I, II and III, to the service of the mobile terminal 20. Accordingly, the base station 10 also needs to allocate sending resource, such as time-frequency resource, to the mobile terminal 20 for sending the three CDMA codes. As shown in FIG. 6, wherein, the sending resource composed by a time slot and a subcarrier is referred to as a resource point, therefore twelve resource points P1 to P12 are shown in FIG. 6. These resource points may all be used as contention resource in existing uplink transmission resource request and allocation mechanism, however, in this embodiment, P11 and P12 thereinto are used as non-contention resource, namely, the allocation of P11 and P12 is not based on the competition of mobile terminals, instead, the base station 10 suitably allocates them and corresponding uplink resource request indication information to at least one service at the beginning of establishment of the service or at a certain moment after the beginning.

In this invention, the suiting rules of sending resource and CDMA code have the following bases:

One: preferably, in order to ensure maximum decoding accuracy, the amount of CDMA codes using the same resource point generally does not exceed cross-correlation factor. Of course, if the resource points available to be used as the above sending resource are in shortage in the system, the preferable base could be broken in precondition that certain error rate is allowable.

Two: the combination of CDMA code, time slot and subcarrier differs from the original combination, as long as either one of CDMA code, time slot and subcarrier changes. In other words, the combination of CDMA code, time slot and subcarrier allocated to different services of a same mobile terminal could identify its corresponding service if only the combination achieves at least one of code division, time division and frequency division, so as to bring convenience to the accuracy of uplink transmission resource request. Of course, services of different mobile terminals are different, thus base two is apparently applied to differing services of different mobile terminals.

Three: according to base two, there may be the case that multiple different CDMA codes share a same resource point in the present invention, i.e. the pure code division multiplexing is adopted. It is readily comprehensible that, these different CDMA codes could either belong to a same service of a same mobile terminal or belong to different services of a same mobile terminal or even belong to services of different mobile terminals. however, it is intelligible to those skilled in the art that, in order to avoid interference, CDMA codes allocated in the same resource point should keep different from each other so as to achieve at least one of code division, time division and frequency division.

Four: still according to base two, in order to save CDMA code resource, the same CDMA code could forms multiple so-called information resource combination in conjunction with multiple different resource points, wherein the information denotes uplink resource request indication information, i.e. CDMA code, while the resource denotes time-frequency resource point in this embodiment. Multiple different combinations generated therefrom differ from each other by means of time division (occupying different time slots but using the same subcarrier) or frequency division (occupying different subcarriers but using the same time slot) or time division plus frequency division (occupying different time slots and using different subcarriers). Specific cases could be determined without creative work by those skilled in the art on basis of resource abundance degree according to the enlightenment of the teaching of the specification. These different combinations could either be allocated to different services, or be allocated to a same service for requesting different uplink transmission resource amount.

In this embodiment, the sending resource of codes I and II is the resource point P11, while the sending resource of codes III is the resource point P12. It is thus clear that, in this embodiment, codes I and II share the same resource point, and the corresponding information resource combinations are differed by different CDMA codes, while respective information resource combination of codes I and 11 differ from the information resource combination of code III and P12 by means of code division and time division. Thus the three different information resource combinations corresponding to the same service come into being.

P1 to P10 as shown in FIG. 6 are still used as contention resource for traditional initial ranging, handover ranging, periodic ranging and competition based bandwidth request.

In the WiMAX system adopting the present invention, the base station 10 could broadcast the attribute of each resource point, i.e. whether belonging to the sending resource of uplink resource request indication information mentioned in the present invention or belonging to traditional contention resource of P1 to P10 as shown in FIG. 6, to each mobile terminal via UL-MAP in the frame header. UL-MAP information could accordingly include the following description of P11 and P12: position, structure, amount, etc. In order to save resource, the above resource point allocation result could be broadcasted only when its content changes instead of being broadcasted in each frame. Accordingly, the mobile terminal 20 preferably stores the allocation result broadcasted from the vase station 10, and performs uplink transmission resource request and other operations according to the previous allocation result all along till the next new allocation comes.

In the step S1, the base station 10 could further generate a control message, which carries the CDMA code allocated to the mobile terminal 20 and the sending resource for the mobile terminal 20 to send this/these CDMA code(s). In the case as shown in FIG. 6, since the non-contention resource points P11 and P12 occupy the same subcarrier, and which subcarrier P11 and P12 use is known for the mobile terminal 20 according to UL-MAP information, the mobile terminal 20 only needs to know the suiting relationship between each CDMA code and the two time slots occupied by P11 and P12. Therefore, in the control message, the base station 10 only needs to indicate the identifier information of the time slot corresponding to each CDMA code.

With reference to FIG. 5, wherein, the step S1 as shown in FIG. 4 preferably takes place before each event as shown in FIG. 5. In FIG. 5, as shown, the voice call service of the mobile terminal 20 requests the base station 10 to allocate resource for several times (under on status), before coming into the silent status as shown, and its standby uplink service data decreases time after time and finally returns to zero. Thus, the requested amount is zero in the BR message sent for the third time as shown. Preferably, when the service data in the cache of the mobile terminal 10 is zero and keeps for a period (such as a time length of a number of frames), the mobile terminal 10 could determine there is no data of the service needing to be sent temporarily, and the service could come into silent status.

Thus the service turns to silent for a period, at a certain moment afterwards, the user of the mobile terminal 20 speaks to the other party of the communication again, then, there is new standby uplink service data in the cache of the mobile terminal 20, such as u shown in FIG. 5.

And then, in the step 32, the mobile terminal 20 judges that it is needed to request to be allocated with uplink transmission resource. Therefore, in the step 53, the mobile station 20 sends at least one CDMA code allocated by the base station 10 by using corresponding sending resource(s) to the base station 10, to request the base station 10 to restart uplink transmission resource allocation for the service.

The detail description of multiple cases of the step S3 is given as below:

EXAMPLE 1

Example 1 is a simple and basic example, wherein, the base station 10 and the mobile terminal 20 did not make an agreement about any corresponding relationship between CDMA code and uplink transmission resource request amount, or between information resource combination and uplink transmission resource request amount. The CDMA code sent from the mobile terminal 20 by using the sending resource only indicates that the mobile terminal 20 has new standby uplink service data, and requires the base station 10 to allocate uplink transmission resource to the service, whereas how much resource to be allocated is determined by the base station 10. According to an unrestrictive example of the present invention, the uplink transmission resource allocation amount determined by the base station 10 in the step S4 could be expressed by the following equation:

$$\sum_{i=1}^{N} a_i \times M_i \quad (1)$$

Wherein, $M_i$ (i=1 ... N) denotes the uplink transmission resource amount allocated to the service of the i-th time in the previous N times of allocating uplink transmission resource to the service, while $a_i$ is a weighting coefficient less than 1 and bigger than 0, and $$\sum_{i=1}^{N} a_i = 1.$$

It is intelligible to those skilled in the art that, the idea in the equation (1) could also be applied to the following various cases.

In case of example 1, it is intelligible to those skilled in the art that, in order to save CDMA code and time-frequency resource, the information resource combination allocated to a service of a mobile terminal is preferably unique. Once the base station receives specific CDMA code from a mobile terminal by using specific time-frequency resource, it knows that the mobile terminal is requesting resource allocation, and then performs corresponding allocation at once.

EXAMPLE 2

The base station 10 and the mobile terminal 20 made an agreement about the uplink transmission resource request amounts corresponding to different CDMA codes. And then, preferably, as mentioned above, the base station 10 allocates multiple CDMA codes, i.e. I, II, III, to a service and allocates sending resource with respect to each code respectively.

In example 2, the base station 10 only cares about which CDMA code is sent from the mobile terminal, but does not care about by using which resource point the CDMA code is sent. In other words, although the base station 10 allocates multiple sending resources for a CDMA code, no matter which sending resource Is used by the mobile terminal 20 to send the CDMA code, in the subsequent step S4, as a feedback, the base station 10 allocates the same uplink transmission resource amount to the service.

In view of this, in order to save time-frequency resource, the base station 10 preferably allocates only one sending resource to each CDMA code.

Accordingly, different CDMA codes such as I, II and III preferable correspond to uplink transmission resource amount, and the base station 10 could informed the mobile terminal of this corresponding relationship when sending management messages. In this example, the purpose why the base station 10 allocates multiple CDMA codes (uplink resource request indication information) to the mobile terminal 20 is to enable the mobile terminal 20 to express the need of uplink transmission resource, if any, most definitely, so that the uplink transmission resource allocated to it by the base station 10 is as close to the need of the mobile terminal 20 as possible, to avoid waste.

In case that the data amount of u is 4500 bytes (4.5 kB), and the codes I, II and III correspond to the resource request amount of 1 kB, 2 kB and 3 kB respectively, therefore, the mobile terminal 20 preferably chooses the code III to send, and the service gets away from silent status, and then, the base station 10 could periodically allocate resource to the service in mode as shown In FIG. 3a. The position of 3 kB resource allocated by the base station 10 is depicted in UL-MAP in the header of a frame, most ideally, the mobile terminal 20 transmits uplink service data by using corresponding resource in the uplink subframe in the frame. If the allocation cycle of uplink transmission resource is composed of five frames, the resource amount could be used by the mobile terminal 20 for the service in each uplink subframe is 0.6 kB. And then, in the last uplink subframe of the cycle, the mobile terminal 20 sends the service data of the size of 0.594 kB together with a BR message of the size of 0.006 kB to the base station 10. Wherein, the BR message is used for requesting the base station 10 to further allocate 1.512 kB resource to the service, wherein, 1.512 kB=4.5 kB−(3 kB−0.006 kB)+0.006 kB, namely the sum amount of the remainder standby uplink service data and a new BR message.

Therefore, most ideally, the BR message sent by the mobile terminal 20 could get response in the header of the next frame. After parsing the UL-MAP information thereinto, the mobile terminal 20 finds its usable uplink transmission resource and sends the remainder standby data frame after frame. Finally, in the last uplink subframe of the cycle, the mobile terminal 20 sends a new BR message together with the last part of uplink service data to the base station 10. Wherein, the new BR message indicates that the uplink resource request amount for the service of the mobile terminal 20 is zero. Thus the service comes into silent status of uncertain period again.

EXAMPLE 3

The base station 10 and the mobile terminal 20 made an agreement about the corresponding relationship between different information resource combinations and uplink resource request amounts. For better understanding, description is given as below by taking a more complex allocation mode of uplink resource request indication information and sending resource. Wherein, the base station 10 allocates codes I, II and III to a service of the mobile terminal 20, the sending resource of code I being P11 and P12, the sending resource of code II being P11, the sending resource of code III being P12.

Therefore, each of codes II and III has one sending resource respectively, but code I has two. In this example, different from example 2, which sending resource the mobile terminal uses to send code I is different for the base station 10. An exemplary corresponding relationship between different information resource combinations and uplink resource request amounts is given in table 1:

TABLE 1 matching relationship between information resource combinations and uplink transmission resource request amounts

| information resource combination | uplink resource request amount |
|---|---|
| code I, P11 | 1 kB |
| code I, P12 | 2 kB |
| code II, P11 | 3 kB |
| code III, P12 | 4 kB |

Therefore, when u as shown in FIG. 5 occurs, the mobile terminal chooses to send code III in P12, so as to obtain maximum resource amount allocated by the base station 10. The rest resource part needed is further obtained by sending another BR message. It is intelligible to those skilled in the art that, the BR message generated for the rest service data, which is not transmitted yet in 5 kB, could also be replaced by a CDMA code sent In specified sending resource. Since the rest service data amount is 1 kB, the mobile terminal 20 sends code I in P11 by the end of the allocation cycle, thus the base station will allocate 1 kB of uplink transmission resource to it subsequently.

EXAMPLE 4

The base station 10 and the mobile terminal 20 made an agreement that the combination of multiple CDMA codes (combination of uplink resource allocation request information, or information combination) corresponds to a specified uplink transmission resource request amount. Preferably, this manner could be used in conjunction with the manner(s) in example 2 or example 3. The conjunction of this example and example 2 is shown in table 2.

TABLE 2

Corresponding relationship between information combinations and uplink transmission resource request amounts

| Information combination | Uplink transmission resource request amount |
|---|---|
| Code I | 1 kB |
| Code II | 2 kB |
| Code III | 3 kB |
| Code I, code II | 4 kB |
| Code I, code III | 5 kB |
| Code II, code III | 6 kB |
| Code I, code I | 7 kB |
| Code I, code II, code III | 8 kB |

It is thus clear that, up to eight uplink resource request amount indication manners are realized. The mobile terminal could flexibly choose a most appropriate manner to use according actual cached data amount.

It could be seen from the last but 2 row of table 2 that, repeated transmission of the same CDMA code could also compose an information combination, certainly, it is generally required to allocate multiple sending resources to the CDMA code.

Of course, different information resource combinations could be further combined to create more uplink resource request amount indication manners, unnecessary details are not given here.

It is intelligible to those skilled in the art that, the sending occasion of using uplink resource request indication information as mentioned above is the specified period when a service is away from silent status, but it is just an example and does not make any restriction to the protection scope of the present invention. In fact, the uplink resource request information and the sending resource provided in the present invention could also be used when the service is of on status. In this condition, the CDMA code replaces the BR message, and the information combination composed of CDMA code and sending resource could approximately indicate to the base station the uplink transmission resource amount expected by the mobile terminal. Compared to BR message, the method(s) provided in the present invention cause(s) less delay to service(s) and less signaling overhead, which benefits to saving system resource.

The present invention is described from the angle of method as above, further de script ion is given as below from the angle of apparatus with reference to apparatus block diagram and in conjunction with FIG. 5 and FIG. 6.

Figure 7:
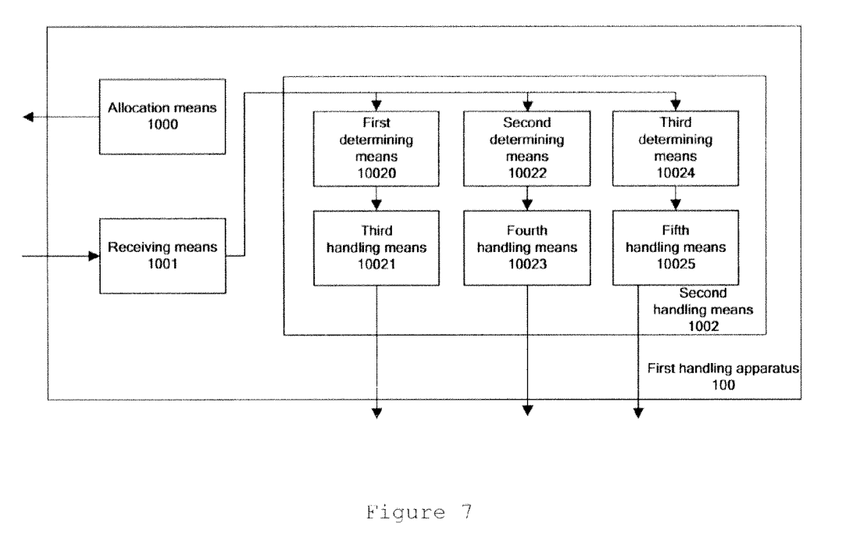
FIG. 7 shows the block diagram of a first handling apparatus, in a base station of the wireless access network, for handling uplink transmission resource allocation, according to an embodiment of the present invention.

Wherein, FIG. 7 shows the block diagram of a first handling apparatus, in a base station of the wireless access network, for handling uplink transmission resource allocation, according to an embodiment of the present invention. The first handling apparatus 100 as shown comprises: an allocation means 1000, a receiving means 1001, a second handling means 1002, wherein the second handling means 1002 further comprises a first determining means 10020, a third handling means 10021, a second determining means 10022, a fourth handling means 10023, a third determining means 10024 and a fifth handling means 10025.

Figure 8:
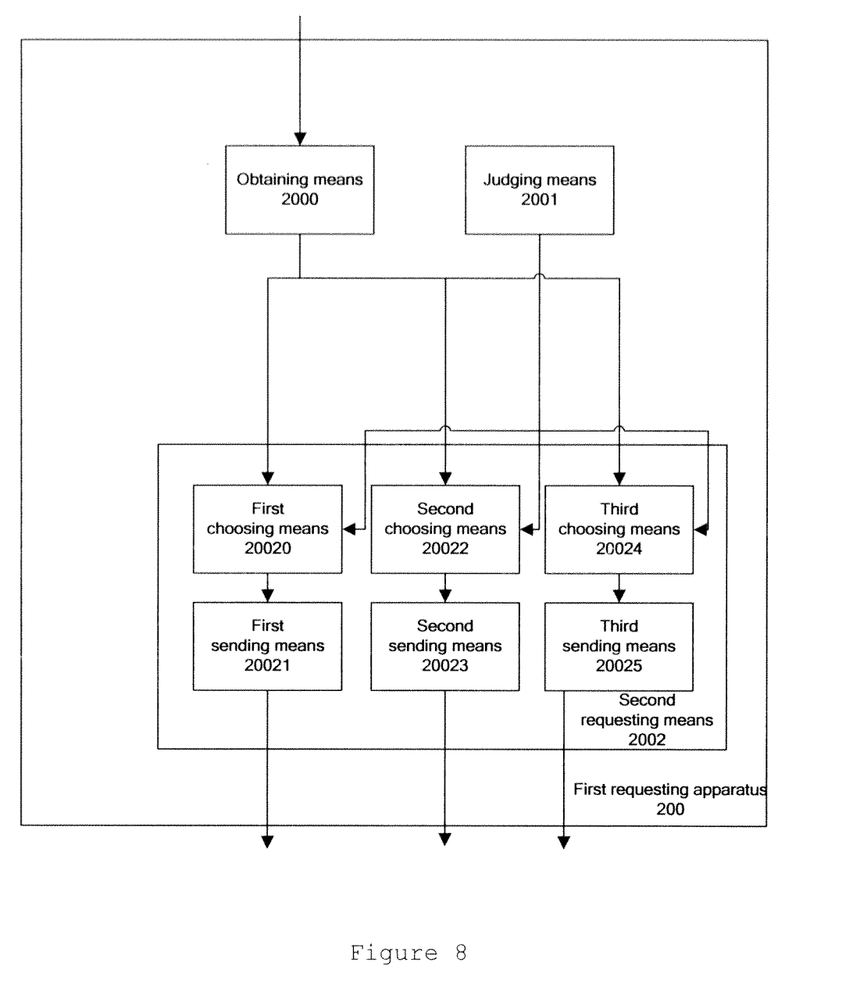
FIG. 8 shows the block diagram of a first requesting apparatus, in a mobile terminal, for requesting for uplink transmission resource, according to an embodiment of the present invention.

FIG. 8 shows the block diagram of a first requesting apparatus, in a mobile terminal, for requesting a base station to allocate uplink transmission resource, according to an embodiment of the present invention. The first requesting apparatus 200 as shown comprises an obtaining means 2000, a judging means 2001 and a second requesting means 2002, wherein the second requesting means 2002 further comprises a first choosing means 20020, a first sending means 20021, a second choosing means 20022, a second sending means 20023, a third choosing means 20024 and a third sending means 20025.

With reference to FIG. 7 and in conjunction with FIG. 5, the allocation means 1000 of the base station 10 allocates uplink resource request indication information and corresponding sending resource to a service, such as voice call service, of the mobile terminal 20. This allocation process commonly could be performed after the base station 10 receiving the uplink service establishment request from the mobile terminal 20, wherein the allocated uplink resource request indication information could be CDMA code, which in specific could be generated by the PRBS (pseudo-random binary sequence) generator of the base station 10 similar to ranging code generator. In this embodiment, the allocation means 1000 allocates three different CDMA codes, denoted as I, II and III, to the service of the mobile terminal 20. Accordingly, the allocation means 1000 of the base station 10 also needs to allocate sending resource, such as time-frequency resource, to the mobile terminal 20 for sending the three CDMA codes. As shown in FIG. 6, wherein, the sending resource composed by a time slot and a subcarrier is referred to as a resource pint, therefore twelve resource points P1 to P12 are shown in FIG. 6. These resource points may all be used as contention resource in existing uplink transmission resource request and allocation mechanism, however, in this embodiment, P11 and P12 thereinto are used as non-contention resource, namely, the allocation of P11 and P12 is not based on the competition of mobile terminals, instead, the base station 10 suitably allocates them and one service at the beginning of establishment of the service or at a certain moment after the beginning.

In this invention, the matching rules of sending resource and CDMA code have the following bases:

One: preferably, in order to ensure maximum decoding accuracy, the amount of CDMA codes using the same resource point generally does not exceed cross-correlation factor. Of course, if the resource points available to be used as the above sending resource is in shortage in the system, the preferable base could be broken in precondition that certain error rate is allowable.

Two: the combination of CDMA code, time slot and subcarrier differs from the original combination, as Long as either one of CDMA code, time slot and subcarrier changes, in other words, the combination of CDMA code, time slot and subcarrier allocated to different services of a same mobile terminal could identify its corresponding service if only the combination achieves at least one of code division, time division and frequency division, so as to bring convenience to the accuracy of uplink transmission resource request. Of course, services of different mobile terminals are different, thus base two is apparently applied to differing services of different mobile terminals.

Three: according to base two, there may be the case that multiple different CDMA codes share a same resource point in the present invention, i.e. the pure code division multiplexing is adopted. It is readily comprehensible that, these different CDMA codes could either belong to a same service of a same mobile terminal or belong to different services of a same mobile terminal or even belong to services of different mobile terminals. However, it is intelligible to those skilled in the art that, in order to avoid interference, CDMA codes allocated in the same resource point should keep different from each other so as to achieve at least one of code division, time division and frequency division.

Four: still according to base two, in order to save CDMA code resource, the same CDMA code could forms multiple so-called information resource combination in conjunction with multiple different resource points, wherein information denotes uplink resource request indication information, i.e. CDMA code, while resource denotes time-frequency resource point in this embodiment. Multiple different combinations generated therefrom differ from each other by means of time division (occupying different time slots but using the same subcarrier) or frequency division (occupying different subcarriers but using the same time slot) or time division plus frequency division (occupying different time slots and using different subcarriers). Specific cases could be determined without creative work by those skilled in the art on basis of resource abundance degree according to the enlightenment of the specification. These different combinations could either be allocated to different services, or be allocation to a same service for requesting different uplink transmission resource amount.

In this embodiment, the sending resource of codes I and II is the resource point P11, while the sending resource of codes III is the resource point P12. It is thus clear that, in this embodiment, codes I and II share the same resource point, corresponding information resource combination being differed by different CDMA codes, while respective information resource combination of codes I and II differ from the information resource combination of code III and P12 by means of code division and time division. Thus three different information resource combinations corresponding to the same service come into being.

P1 to P10 as shown in FIG. 6 are still used as contention resource for traditional initial ranging, handover ranging, periodic ranging and competition based bandwidth request.

In the WiMAX system adopting the present invention, the allocation means 1000 of the base station 10 could broadcast the attribute of each resource point, i.e. whether belonging to the sending resource of uplink resource request indication information mentioned in the present invention or belonging to traditional contention resource of P1 to P10 as shown in FIG. 6, to each mobile terminal via UL-MAP in the frame header. UL-MAP information could accordingly include the following description of P11 and P12: position, structure, amount, etc. In order to save resource, the above resource point allocation result could be broadcasted only when its content changes instead of being broadcasted in each frame. Accordingly, the mobile terminal 20 preferably stores the allocation result broadcasted from the base station 10, and performs uplink transmission resource request and other operations according to the previous allocation result all along till the next new allocation comes.

The allocation means 1000 of the base station 10 further generates a control message, which carries the CDMA code allocated to the mobile terminal 20 and the sending resource for the mobile terminal 20 to send this/these CDMA code(s). In the case as shown in FIG. 6, since the non-contention resource points P11 and P12 occupy the same subcarrier, and which subcarrier P11 and P12 use is known for the mobile terminal 20 according to UL-MAP information, the mobile terminal 20 only needs to know the matching relationship between each CDMA code and the two time slots occupied by P11 and P12. Therefore, in the control message, the allocation means 1000 only needs to indicate the identifier information of the time slot corresponding to each CDMA code.

Corresponding information sent from the allocation means 1000 is obtained by the obtaining means of the mobile terminal 20, and is provided to corresponding downstream means such as first, second, third choosing moans.

With reference to FIG. 5, wherein, the process performed by the allocation means 1000 preferably takes place before each event as shown in FIG. 5. In FIG. 5, the voice call service of the mobile terminal 20 requests the base station 10 to allocate resource for several times (under on status), before coming into the silent status as shown, as shown, Its standby uplink service data decreases time after time and finally returns to zero. Then, the requested amount is zero in the BR message sent for the third time as shown. Preferably, when the service data in the cache of the mobile terminal 10 is zero and keeps for a period (such as the time length of a number of frames), the mobile terminal 10 could determine there is no data of the service needing to be sent temporarily, and the service could come into silent status.

Thus the service turns to silent for a period, at a certain moment afterwards, the user of the mobile terminal 20 speaks to the other party of the communication again, then, there is new standby uplink service data in the cache of the mobile terminal 20, such as u shown in FIG. 5.

And then, the judging means 2001 of the mobile terminal 20 judges that it is needed to request to allocate uplink transmission resource. Therefore, the mobile station 20 needs to send at least one CDMA code allocated by the base station 10 by using corresponding sending resource (s) to the base station 10, to request the base station 10 to restart uplink transmission resource allocation for the service.

The detail description of multiple possible subsequent process of the base station 10 and the mobile terminal 20 based on the present invention is given as below;

EXAMPLE 1

Example 1 is a simple and basic example, wherein, the base station 10 did not make an agreement with the mobile terminal 20 via its allocation means 1000 about any matching relationship between CDMA code and uplink transmission resource request amount, or between information resource combination and uplink transmission resource request amount. The CDMA code sent from the mobile terminal 20 by using the sending resource only indicates that the mobile terminal 20 has new standby uplink service data, and requires the base station 10 to allocate uplink transmission resource to the service, whereas how much resource to be allocated is determined by the base station 10. According to example 1, the second requesting means could be simplified as a simple sending means, so as to send an allocated CDMA code on basis of the judgment of Yes of the judging means 2001. According to an unrestrictive example of the present invention, the uplink transmission resource allocation amount determined by the second handling means 1002 equivalent to a determining means could be expressed by the following equation:

$$\sum_{i=1}^{N} a_i \times M_i \quad (1)$$

Wherein, $M_i$ (i=1 ... N) denotes the uplink transmission resource amount allocated to the service of the i-th time in the previous N times of allocating uplink transmission resource to the service, while $\alpha_i$ is a weighting coefficient less than 1 and bigger than 0, and $$\sum_{i=1}^{N} a_i = 1.$$

It is intelligible to those skilled in the art that, the idea in the equation (1) could also be applied to the following cases.

In case of example 1, it is intelligible to those skilled in the art that, in order to save CDMA code and time-frequency resource, the information resource combination allocated to a service of a mobile terminal is preferably unique. Once the base station receives specified CDMA code from a mobile terminal by using specified time-frequency resource, it knows that the mobile terminal is requesting resource allocation, and then performs corresponding allocation at once.

EXAMPLE 2

The base station 10 made an agreement with the mobile terminal 20 via the allocation means 1000 about the uplink transmission resource request amounts corresponding to different CDMA codes. And then, preferably, as mentioned above, the allocation means 1000 allocates multiple CDMA codes, i.e. I, II, III, to a service and allocates sending resource with respect to each code respectively. The first determining means 10020 and the third handling means 10021 of the base station 10 and the first choosing means 20020 and the first sending means 20021 of the mobile terminal 20 are applied to the case of example 2. It is intelligible to those skilled in the art that, if the base station 10 and each mobile terminal realize the present invention only by means of example 2, other submeans in the second handling means 1002 and the second requesting means 2002 are omissible. Besides, it is also intelligible to those skilled in the art that, in practical application, the third, fourth, fifth handling means could be realized by the same hand ling means, similarly, the first, second, third choosing means could be realized by the same choosing means, the first, second, third sending means could be realized by the same sending means.

In example 2, the second handling means 1002 of the base station 10 only cares about: which CDMA code is sent from the mobile terminal, but does root care about by using which resource point the CDMA code is sent, in other words, although t he base station 10 allocates multiple sending resources for a CDMA code, no matter which sending resource is used by the mobile terminal 20 to send the CDMA code, as feedback, in the subsequent step S4, the base station 10 allocates the same uplink transmission resource amount to the service.

In view of this, in order to save time-frequency resource, the allocation means 1000 of the base station 10 preferably allocates only one sending resource to each CDMA code.

Accordingly, different CDMA codes such as I, 11 and III preferably correspond to uplink transmission resource amount, and this matching relationship could be informed to the mobile terminal by the allocation means 1000 together with sending management message. In this example, the purpose why the base station 10 allocates multiple CDMA codes (uplink resource request indication information) to the mobile terminal 20 is to enable the mobile terminal 20 to express the need of uplink transmission resource, if any, most definitely, so that the uplink transmission allocated to it by the base station 10 is as close to the need of the mobile terminal 20 as possible, to avoid waste.

In case that the data amount of u is 4500 bytes (4.5 kB), and the codes I, II and III correspond to the resource request amount of 1 kB, 2 kB and 3 kB respectively, therefore, the first choosing means 20020 of the mobile terminal 20 preferably chooses the code III to send, and the service gets away from silent status. Code III is received by the receiving means 1001 and transferred to the first determining means 10020. And then, the first determining means 10020 of the base station 10 could determine its resource request according to the received CDMA code and the prestored matching relationship between codes and resource request amounts, and instruct the third handling means 10021 to periodically allocate resource to the service in mode as shown in FIG. 3a. The position of 3 kB resource allocated by the third handling means 10021 of the base station 10 is depicted in UL-MAP in the header of a frame, most ideally, the mobile terminal 20 transmitts uplink service data by using corresponding resource in the uplink subframe in the frame. If the allocation cycle of uplink transmission resource is composed of five frames, the resource amount could be used by the mobile terminal 20 for the service in each uplink subframe is 0.6 kB. And then, in the last uplink subframe of the cycle, the mobile terminal 20 sends the service data of the size of 0.594 kB together with BR message of the size of 0.006 kB to the base station 10. Wherein, BR message is used for requesting the base station 10 for further allocate 1.512 kB resource to the service, wherein, 1.512 kB=4.5 kB−(3 kB−0.006 kB)+0.006 kB, namely the sum amount of the remainder standby uplink service data and a new BR message.

Therefore, most ideally, the BR message sent by the mobile terminal 20 could get response in the header of the next frame. After parsing the UL-MAP information thereinto, the mobile terminal 20 finds its usable uplink transmission resource and sends the remainder standby data frame after frame. Finally, in the last uplink subframe of the cycle, the mobile terminal 20 sends a new BR message together with the last part of uplink service data to the base station 10. Wherein, the new BR message indicates that the uplink resource request amount for the service of the mobile terminal 20 is zero. Thus the service comes into silent status of uncertain period again.

EXAMPLE 3

The base station 10 made an agreement with the mobile terminal 20 via the allocation means 1000 about the matching relationship between different information resource combinations and uplink resource request amounts. For better understanding, description is given as below by baking a more complex allocation mode of uplink resource request indication information and sending resource. Where in, the allocation means 1000 allocates codes I, II and III to a service of the mobile terminal 20, the sending resource of code I being P11 and P12, the sending resource of code II being P11, the sending resource of code III being P12.

Therefore, codes II and III have one sending resource respectively, but code I has two. In this example, different from example 2, which sending resource the mobile terminal uses to send code I is different for the base station 10. An exemplary matching relationship between different information resource combinations and uplink resource request amounts is given in table 1 as above.

Therefore, when u as shown in FIG. 5 occurs, the second choosing means 20022 of the mobile terminal chooses to send code III in P12 and indicates the second sending means 20023 to perform sending, thus the second determining means 10022 could determine the resource request amount of the service of the mobile terminal 20 and indicate the fourth handling means 10023 to perform allocation, so that the mobile terminal 20 obtains maximum resource amount allocated by the base station 10. The rest part needed is further obtained by sending another BR message. It is intelligible to those skilled in the art that, the BR message generated for the rest service data, which is not transmitted yet, in 5 kB could also be replaced by a CDMA code sent in specified sending resource. Since the rest service data amount is 1 kB, the second sending means 20023 of the mobile terminal 20 sends code I in P11 again by the end of the allocation cycle, thus the base station will allocate 1 kB of uplink transmission resource to it subsequently.

EXAMPLE 4

The base station 10 made an agreement with the mobile terminal 20 via the allocation means 1000, that the combination of multiple CDMA codes (combination of uplink resource allocation request information, or information combination) corresponds to a specified uplink transmission resource request amount. Preferably, this manner could be used in conjunction with the manner(s) in example 2 or example 3. The conjunction of this example and example 2 is shown in table 2 as above.

It is thus clear that, up to eight uplink resource request amount indication manners. The third choosing means 20024 of the mobile terminal 20 could flexibly choose a most appropriate manner to use according actual cache data amount, and indicate the third sending means 20025 to send it. The third determining means 10024 of the base station 10 determines the resource request amount according to the CDMA code set sent from the third sending means 20025, and indicates the fifth handling means 10025 to perform.

It could be seen from the last but 2 row of table 2 that, repeated transmission of the same CDMA code could also compose an information combination, certainly, it is generally required to allocate multiple sending resources to the CDMA code.

Of course, different information resource combinations could be further combined to create more uplink resource request amount indication manners, unnecessary details are not given here.

It is intelligible to those skilled in the art that, the sending occasion of using uplink resource request indication information as mentioned above is the specified period when a service is away from silent status, but it is just example and does not make any restriction to the protection scope of the present invention. In fact, the uplink resource request information and the sending resource provided in the present invention could also be used when the service is of on status, in this condition, CDMA code replaces BR message, and the information combination composed of CDMA code and sending resource; could approximately indicate to the base station the uplink transmission resource amount expected by thee mobile terminal. Compared to BR message, the method(s) provided in the present invent ion cause(s) less delay to service (s) and less signaling overhead, which benefits to saving system resource.

The embodiments of the present invent ion have been described above. It is understandable by those skilled in the art that the present invention is not limited to the above specific embodiments, and various modifications or amendments can be made without departing from the scope and spirit of the scope of the attached claims. The protection scope of the invention is depending on the protection scope of the claims.

What is claimed is:

1. A method, in a base station of the wireless access network, of handling uplink transmission resource allocation, comprising:
   allocating, by the base station, at least one uplink resource request indication information to a service of a mobile terminal, and allocating at least one sending resource with respect to each uplink resource request indication information;
   wherein, the allocated sending resource enables said mobile terminal to send at least one said uplink resource request indication information to said base station within the longest permissible delay of said service when said mobile terminal needs to send uplink service data, and services of different mobile terminals or different services of the same mobile terminal will be allocated with different uplink resource request indication information and/or different sending resources by said base station,
   the method further comprising:
   a. receiving at least one said uplink resource request indication information sent by said mobile terminal by use of corresponding sending resource;
   b. handling the uplink transmission resource allocation for said service, according to the received said at least one uplink resource request indication information.

2. A method according to claim 1, wherein, after the base station receives one said uplink resource request indication information sent by said mobile terminal with at least one sending resource, handling the uplink transmission resource allocation for said service comprises:

determining the uplink transmission resource request amount of said service according to the received uplink resource request indication information, based on the pre-stored corresponding relationship between each uplink resource request indication information and corresponding uplink transmission resource request amount;

handling the uplink transmission resource allocation for said service, according to the determined uplink transmission resource request amount.

3. A method according to claim 1, wherein, after the base station receives an uplink resource request indication information sent by said mobile terminal with a sending resource, handling the uplink transmission resource allocation for said service comprises:

determining the uplink transmission resource request amount of said service according to the information resource combination consisting of the received uplink resource request indication information and the sending resource employed by said mobile terminal, based on the pre-stored corresponding relationship between the information resource combinations, consisting of each uplink resource request indication information and its corresponding sending resource, and corresponding uplink transmission resource request amount;

handling the uplink transmission resource allocation for said service, according to the determined uplink transmission resource request amount.

4. A method according to claim 1, wherein, after the base station receives multiple same or different uplink resource request indication information sent by said mobile terminal, handling the uplink transmission resource allocation for said service further comprises:

determining the uplink transmission resource request amount of said service according to the received multiple same or different uplink resource request indication information, based on the pre-stored corresponding relationship between the information combinations consisting of multiple same or different uplink resource request indication information and the corresponding uplink transmission resource request amount;

handling the uplink transmission resource allocation for said service, according to the determined uplink transmission resource request amount.

5. A method according to claim 1, wherein, said service is a delay sensitive service.

6. A method according to claim 1, wherein, said uplink resource request indication information comprises CDMA code.

7. A method according to claim 1, wherein, a same sending resource is allocated to send multiple different uplink resource request indication information at the same time.

8. A method according to claim 7, wherein, the number of different uplink resource request indication information, which are sent by the same allocated sending resource, is determined according to the error-tolerant rate in decoding and the concurrent probability of said different uplink resource request indication information.

9. A method according to claim 1, wherein, no sending resource is allocated to send multiple same uplink resource request indication information.

10. A method, in a mobile terminal, of requesting a base station to allocate uplink transmission resource, comprising:

obtaining, by the mobile terminal, at least one uplink resource request indication information allocated by the base station to a service of said mobile terminal, and at least one sending resource allocated with respect to each uplink resource request indication information therein;

wherein, the allocated sending resource enables said mobile terminal to send at least one said uplink resource request indication information to said base station within the longest permissible delay of said service, when said mobile terminal needs to send uplink service data, the method further comprises:

A. judging whether needing to request the base station to allocate said uplink transmission resource for said service;

B. sending at least one said uplink resource request indication information to said base station by using corresponding sending resource, if needing to request the base station to allocate uplink transmission resource for said service.

11. A method according to claim 10, wherein, different uplink resource request indication information allocated is in correspondence with different uplink transmission resource request amount respectively, wherein, when said base station has allocated multiple uplink resource request indication information for said service, sending at least one said uplink resource request indication information comprises:

choosing one from said multiple uplink resource request indication information allocated by the base stations to said service according to current uplink transmission resource request amount of said service, if needing to request the base station to allocate uplink transmission resource for said service;

sending said uplink resource request indication information to said base station by using the sending resource allocated to send said uplink resource request indication information.

12. A method according to claim 10, wherein, different information resource combinations, consisting of each uplink resource request indication information and its corresponding sending resource, are in correspondence with different uplink transmission resource request amount, sending at least one said uplink resource request indication information further comprises:

choosing one from said multiple information resource combinations according to the uplink transmission resource request amount of said service, if needing to request the base station to allocate uplink transmission resource for said service;

sending the uplink resource request indication information in the chosen information resource combination to the base station by using the sending resource in the chosen information resource combination.

13. A method according to claim 10, wherein, different information combinations, consisting of multiple same or different uplink resource request indication information, are in correspondence with different uplink transmission resource request amount, sending at least one said uplink resource request indication information further comprises:

choosing one from the multiple different information combinations according to uplink transmission resource request amount of said service, if needing to request the base station to allocate uplink transmission resource for said service;

sending each uplink resource request indication information in said information combination to said base station by using corresponding sending resource.

14. A method according to claim 10, wherein, said service is a delay sensitive service.

15. A method according to claim 10, wherein, said uplink resource request indication information comprises CDMA code.

* * * * *